US007904082B2

(12) United States Patent
Graves et al.

(10) Patent No.: US 7,904,082 B2
(45) Date of Patent: *Mar. 8, 2011

(54) ACARS MESSAGES OVER IRIDIUM

(75) Inventors: Debra J. Graves, Annapolis, MD (US); Rolf Stefani, West River, MD (US); William Brian Pemberton, Baltimore, MD (US); Alan Martin Williard, Severn, MD (US); Ernest Joseph Siegrist, Davidsonville, MD (US)

(73) Assignee: ARINC Incorporated, Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/621,158

(22) Filed: Nov. 18, 2009

(65) Prior Publication Data

US 2010/0062761 A1 Mar. 11, 2010

Related U.S. Application Data

(60) Division of application No. 11/767,128, filed on Jun. 22, 2007, which is a continuation-in-part of application No. 10/642,627, filed on Aug. 19, 2003, now Pat. No. 7,398,057.

(60) Provisional application No. 60/404,388, filed on Aug. 20, 2002.

(51) Int. Cl.
*H04W 4/00* (2009.01)
(52) U.S. Cl. ........... 455/431; 455/68; 455/427; 709/227; 709/230; 709/249; 709/238; 342/457; 342/36
(58) Field of Classification Search .................. 455/427, 455/431, 411; 709/227, 230, 249, 238; 342/457, 342/36
See application file for complete search history.

(56) References Cited

U.S. PATENT DOCUMENTS 5,612,958 A * 3/1997 Sannino ........................ 370/394
5,742,336 A   4/1998 Lee (Continued)

FOREIGN PATENT DOCUMENTS

GB 2320992 A 7/1998

(Continued)

OTHER PUBLICATIONS

International Communications Group; "Introduction to ACARS Messaging Services"; .Application Note ICS—200-01; Jan. 27, 2006.

(Continued)

*Primary Examiner* — Pierre-Louis Desir
(74) *Attorney, Agent, or Firm* — Ronald E. Prass, Jr.; Prass LLP

(57) ABSTRACT

A system in a method are provided for sending and receiving messages between a point located on the ground and a point located on an aircraft via an Iridium Short Burst Data Service. The messages may conform to Airlines Electronic Engineering Committee (AEEC) Specification 618. The messages may be ground-to-air messages or air-to-ground messages. The messages may be ACARS messages and at least some of the messages may have a length exceeding a maximum payload of the Iridium Short Burst Data Service. ACARS messages, which exceed the maximum payload of the Iridium Short Burst Data Service may be segmented and each of the segments may be sent in respective Iridium Short Burst Data messages via the Iridium Short Burst Data Service. When the separate Iridium Short Burst Data messages are received, the segments may be combined to reconstruct the ACARS message for delivery to an intended destination.

4 Claims, 5 Drawing Sheets

U.S. PATENT DOCUMENTS

| | | | |
|---|---|---|---|
| 5,761,625 | A | 6/1998 | Honcik et al. |
| 5,798,458 | A | 8/1998 | Monroe |
| 5,809,402 | A | 9/1998 | Lemme |
| 5,828,373 | A | 10/1998 | Yves |
| 5,920,807 | A | 7/1999 | Lemme |
| 6,009,356 | A | 12/1999 | Monroe |
| 6,023,239 | A | 2/2000 | Kovach |
| 6,173,230 | B1 | 1/2001 | Camus et al. |
| 6,246,320 | B1 | 6/2001 | Monroe |
| 6,275,767 | B1 | 8/2001 | Delseny et al. |
| 6,308,044 | B1 | 10/2001 | Wright et al. |
| 6,353,779 | B1 | 3/2002 | Simon et al. |
| 6,366,311 | B1 | 4/2002 | Monroe |
| 6,384,778 | B1 | 5/2002 | Campbell |
| 6,384,783 | B1 | 5/2002 | Smith et al. |
| 6,385,513 | B1 | 5/2002 | Murray et al. |
| 6,393,297 | B1 | 5/2002 | Song |
| 6,400,945 | B1 | 6/2002 | Jensen et al. |
| 6,657,578 | B2 | 12/2003 | Stayton et al. |
| 2002/0004411 | A1 | 1/2002 | Heppe et al. |
| 2003/0003872 | A1 | 1/2003 | Brinkley et al. |
| 2003/0030581 | A1* | 2/2003 | Roy .............................. 342/36 |
| 2003/0032426 | A1* | 2/2003 | Gilbert et al. ................. 455/427 |
| 2003/0041155 | A1 | 2/2003 | Nelson et al. |
| 2003/0062447 | A1 | 4/2003 | Cordina et al. |
| 2003/0065428 | A1 | 4/2003 | Mendelson et al. |
| 2003/0093798 | A1 | 5/2003 | Rogerson |
| 2003/0094541 | A1 | 5/2003 | Zeineh |
| 2003/0109973 | A1 | 6/2003 | Hensey et al. |
| 2004/0008253 | A1 | 1/2004 | Monroe |
| 2006/0167598 | A1 | 7/2006 | Pennarola |

FOREIGN PATENT DOCUMENTS

| | | |
|---|---|---|
| GB | 2347586 A | 9/2000 |
| GB | 2350972 A | 12/2000 |
| WO | 0103437 A1 | 1/2001 |

OTHER PUBLICATIONS

International Communications Group; "Introduction to ACARS Messaging Services"; .Application Note ICS-200-01; "Preliminary Release Apr. 17, 2006".

Iridium; Iridium Satellite Data Services, White Paper; Version 1.0; Jun. 2, 2003.

* cited by examiner

ACARS MESSAGES OVER IRIDIUM

This application is a divisional of U.S. patent application Ser. No. 11/767,128, filed in the U.S. Patent and Trademark Office on Jun. 22, 2007, which is a continuation-in-part of U.S. patent application Ser. No. 10/642,627, filed in the U.S. Patent and Trademark Office on Aug. 19, 2003, which claims the benefit of U.S. Provisional Application No. 60/404,388, filed in the U.S. Patent and Trademark Office on Aug. 20, 2002. The contents of U.S. patent application Ser. Nos. 10/642,627, 11/767,128 and U.S. Provisional Application No. 60/404,388 are incorporated by reference herein in their entireties.

BACKGROUND OF THE INVENTION

1. Field of the Invention

This invention relates generally to transmission of messages through the Iridium Short Burst Data Service. More specifically, this invention relates to transmission of ground to-air and air-to ground messages, conforming to Airlines Electronics Engineering Committee Specification 618, through the Iridium Short Burst Data Service.

2. Description of Related Art

Aircraft Communication Addressing and Reporting System (ACARS) is a well-known data protocol defined by Airlines Electronic Engineering Committee (AEEC) Specification 618. ACARS provides connectivity for character-based data between an aircraft and one or more ground-based service providers.

VHF communication provides only line-of-sight communication coverage while satellite communication provides oceanic and polar communication coverage. However, satellite communication has been expensive for use with ACARS. The Iridium Short Burst Data Service is a lower cost alternative to conventional satellite communication. The Iridium Short Burst Data Service is designed, such that small data messages or frequently transmitted data messages may be sent more economically compared with transmitting the messages via circuit switched data services.

Equipment on board commercial aircraft adhere to AEEC specifications. Systems have been developed which provide ACARS-like messages sent through the Iridium satellite network. However, these systems do not support ACARS air/ground protocol and therefore, the ACARS-like messages cannot be passed to existing avionic equipment aboard an aircraft.

The ACARS air/ground protocol provides for transmission of messages in pieces called blocks. According to the protocol, receipt of each block is acknowledged. Elements of the message blocks may convey information to the avionic equipment, such as, for example, peripheral addressing information or other information. The systems, which provide ACARS-like messages, do not provide the information conveyed by the elements of the message blocks to the avionic equipment. Commercial airlines, using the systems which provide ACARS-like messages, are incapable of conveying the information from the elements of the message blocks to the avionics equipment without either revamping or replacing the existing avionics equipment. However, such revamping or replacing of the existing avionics equipment may cause the equipment to no longer comply with AEEC specification 618.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system and a method are provided for sending and receiving messages, conforming to Airlines Electronic Engineering Committee (AEEC) Specification 618, between a point located on the ground and a point located on an aircraft. In one embodiment, a communication device aboard an aircraft may receive an Iridium Short Burst Data message, which may include at least a portion of a message conforming to AEEC Specification 618 and an added header including an application indicator for indicating one of a number of applications to which the at least a portion of the message conforming to AEEC Specification 618 pertains. The communication device aboard the aircraft may deliver the at least a portion of the message, without the added header, to avionics equipment aboard the aircraft.

In a second embodiment, a communication device for use aboard an aircraft is provided. The communication device may include an L-band transceiver to receive and send Iridium Short Burst Data messages from and to a ground-based communication device, a header stripper to discard a header from a received Iridium Short Burst Data message, which may include at least a portion of a message conforming to AEEC Specification 618. The header may include an application indicator for indicating one of a number of applications to which the at least a portion of the message pertains, a message identifier for associating a group of message portions of the message conforming to the AEEC Specification 618 with a particular message, and a segment offset indicating a placement of each of the group of message portions with respect to the message conforming to the AEEC Specification 618, and a communication interface to send the message conforming to the AEEC Specification 618 to avionics equipment aboard the aircraft.

In a third embodiment, a ground-based communication device is provided. The ground-based communication device may include a communication interface, a header adder, and an L-band transceiver. The communication interface may be used for receiving from and sending to a ground-based processing device, messages conforming to AEEC Specification 618. The header adder may add a header to at least a portion of a message conforming to AEEC Specification 618, received from the ground-based processing device. The header may include an application indicator for indicating one of a number of applications to which the at least a portion of the message pertains, a message identifier for associating a number of message portions of the message conforming to the AEEC Specification 618, and a segment offset indicating a placement of each of the number of message portions with respect to the message conforming to the AEEC Specification 618. The L-band transceiver may send an Iridium Short Burst Data message to an aircraft-based communication device. The Iridium Short Burst Data message may include the at least a portion of the message conforming to the AEEC Specification 618 and the added header.

DRAWINGS

In order to describe the manner in which the above-recited and other advantages and features can be obtained, a more particular description is provided below and will be rendered by reference to specific embodiments thereof, which are illustrated in the appended drawings. Understanding that these drawings depict only typical embodiments and are not therefore to be considered to be limiting of its scope, implementations will be described and explained with additional specificity and detail through the use of the accompanying drawings in which.

Figure 5:
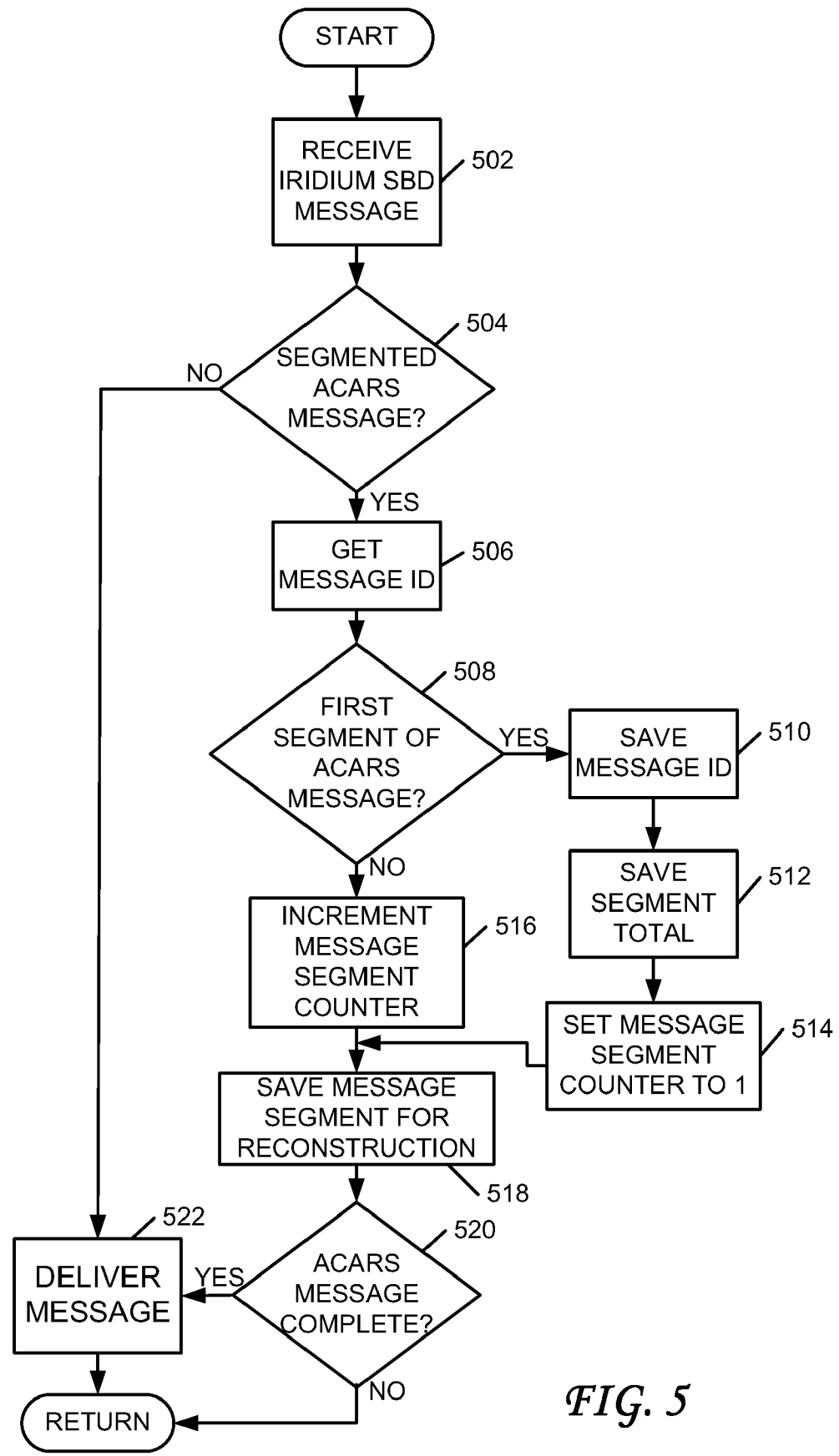
Figure 6:
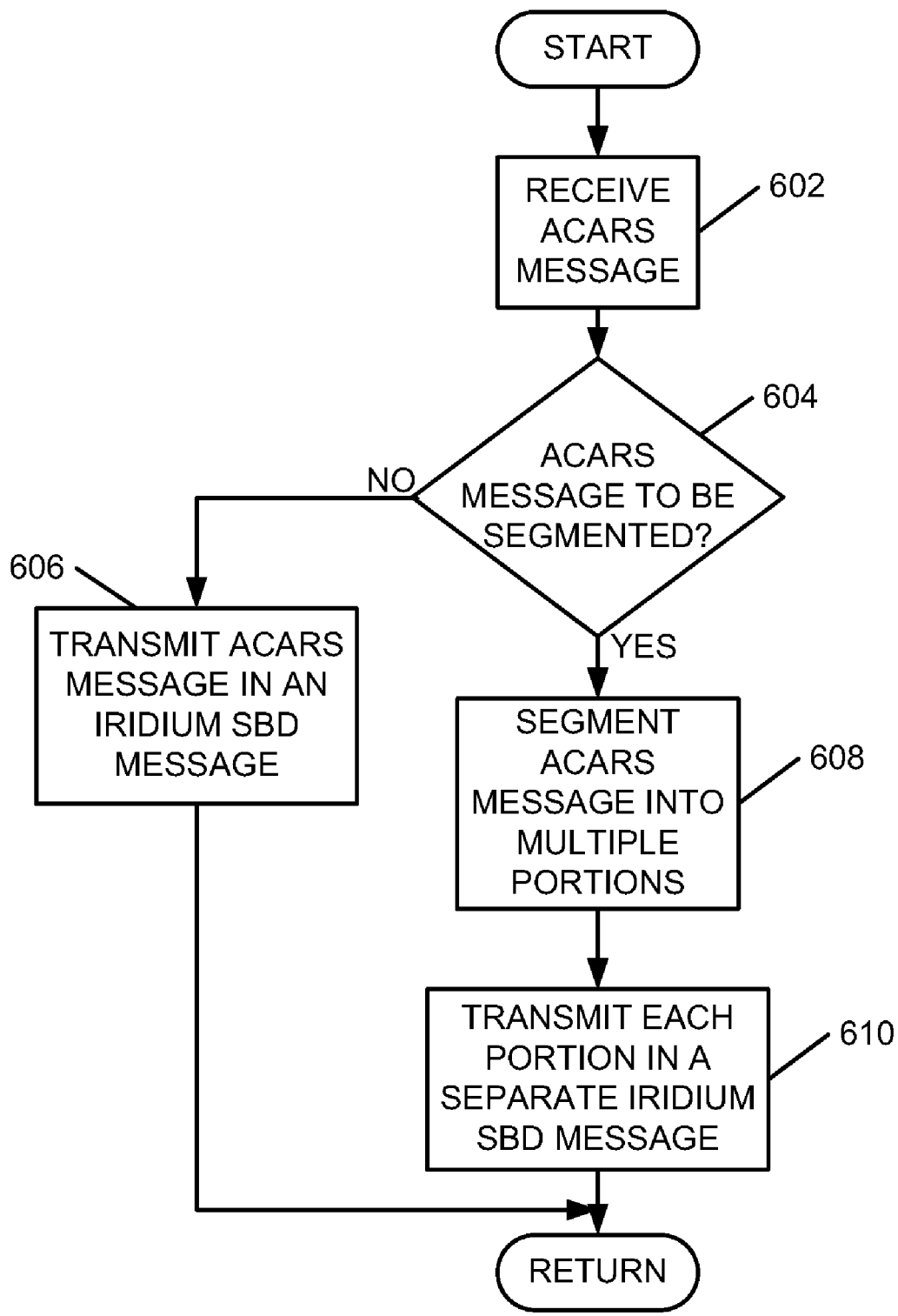

FIG. 5 is a flowchart illustrating exemplary processing, which may be performed in an aircraft-based communication device or a ground-based communication device in an embodiment consistent with the subject matter of this disclosure; and FIG. 6 is a flowchart illustrating an exemplary process, which may be performed by an aircraft-based communication device or a ground-based communication device when receiving an ACARS message.

DETAILED DESCRIPTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or maybe learned by the practice of the invention as set forth herein.

Various embodiments of the invention are discussed in detail below. While specific implementations are discussed, it should be understood that this is done for illustration purposes only. A person skilled in the relevant art will recognize that other component configurations may be used without parting from the spirit and scope of the invention.

The invention comprises a variety of embodiments, such as a method and processing device and other embodiments that relate to the basic concepts of the invention. Note that while this disclosure discusses aircraft and airline uses for the attention, the invention by no means is limited to that area and may be applied to a wide variety of environments and uses.

Overview

In embodiments consistent with the subject matter of this disclosure, a system and method may be provided by which messages conforming to AEEC specification 618 may be passed between one or more ground-based data providers and avionics equipment aboard an aircraft via the Iridium Short Burst Data Service. The messages may be ground-to-air or air-to-ground messages.

In some embodiments, the messages conforming to the AEEC specification 618 may be ACARS messages and at least some of the messages may have a length exceeding a maximum payload of the Iridium Short Burst Data Service. In such embodiments, an ACARS message exceeding the maximum payload of the Iridium Short Burst Data Service may be segmented and each of the segments may be sent via the Iridium Short Burst Data Service in separate Iridium Short Burst Data messages. When the separate Iridium Short Burst Data messages are received, the segments may be combined to reconstruct the ACARS message for delivery to an intended destination.

Exemplary Operating Environment

Figure 1:
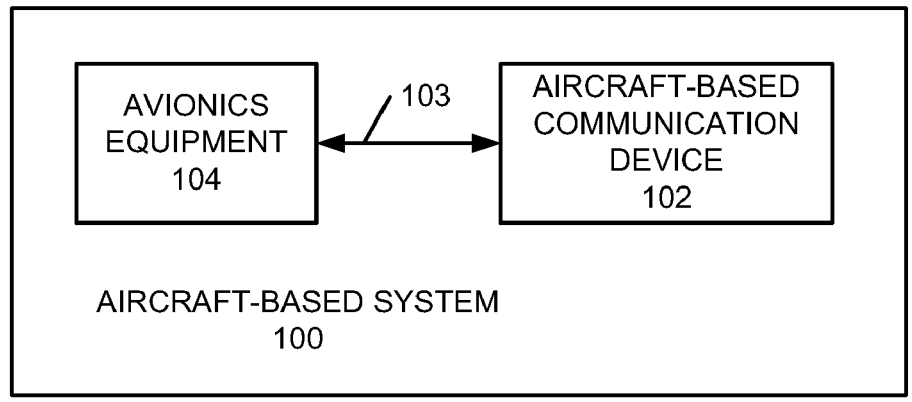
FIG. 1 illustrates an exemplary operating environment in which embodiments consistent with the subject matter of this disclosure may operate.
Figure 1:
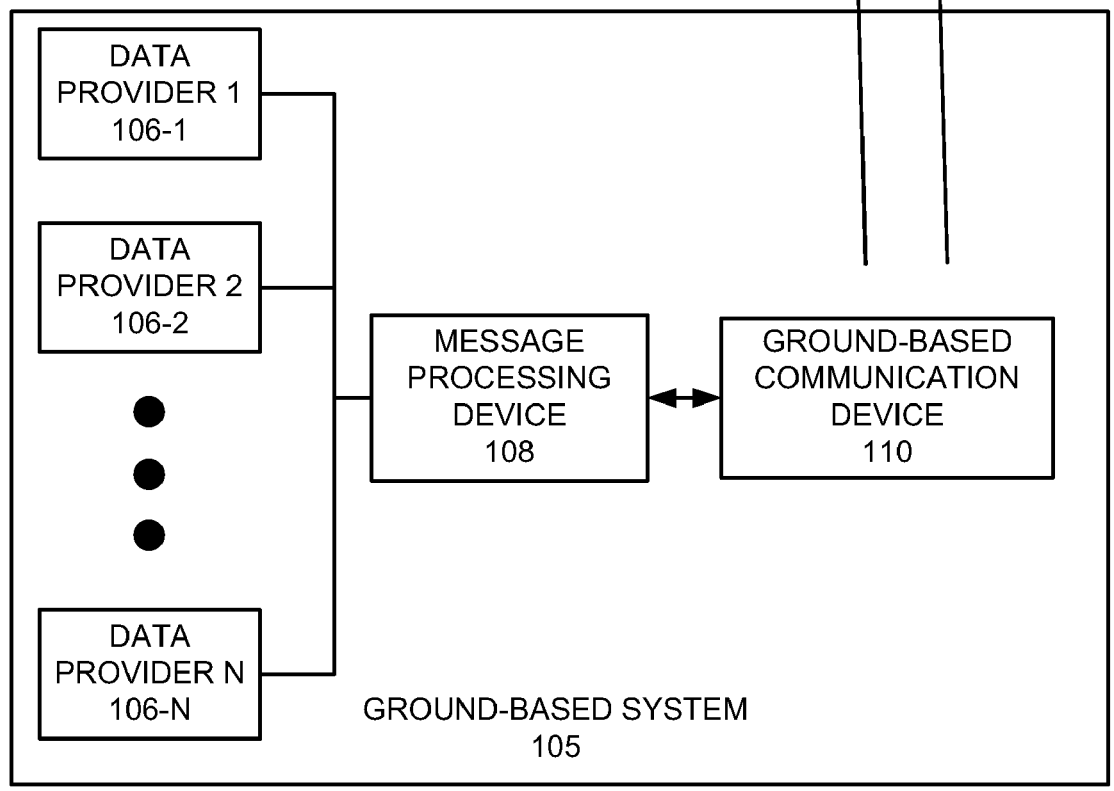

FIG. 1 illustrates an exemplary operating environment in which embodiments consistent with the subject matter of this disclosure may operate. The environment may include an aircraft-based system 100 and a ground-based system 105.

Aircraft-based system 100 may be located on an aircraft and may include avionics equipment 104 and an aircraft-based communication device 102. Aircraft-based communication device 102 and avionics equipment 104 may be connected via a bus 103, which in some embodiments may include an ARINC 429 communication bus. Aircraft-based communication device 102 may receive one or more Iridium Short Burst Data messages via the Iridium Short Burst Data Service. Each of the Iridium Short Burst Data Messages may include a complete ACARS message or a portion of a segmented ACARS message. If portions of a segmented ACARS message are received by aircraft-based communication device 102, then aircraft-based communication device 102 may combine the segmented portions of the ACARS message to reconstruct the ACARS message. Aircraft-based communication device 102 may then deliver the ACARS message to avionics equipment 104. Avionics equipment 104 may send an ACARS acknowledgment to ground-based system 105 via bus 103, aircraft-based communication device 102, and the Iridium Short Burst Data Service. Further, avionics equipment 104 may provide an ACARS message to aircraft-based communication device 102 for transmission through the Iridium Short Burst Data Service to ground-based system 105. If the ACARS message exceeds a maximum payload capacity of the Iridium Short Burst Data Service, then aircraft-based communication device 102 may segment the ACARS message into a number of portions, each of which may be transmitted to ground-based system 105 in a separate Iridium Short Burst Data message.

Ground-based system 105 may include data sources, such as, for example data provider 1 106-1, data provider 2 106-2, . . . data provider N 106-N, a message processing device 108, and a ground-based communication device 110. Data providers 106 may include a number of data providers providing data such as, for example, weather data, navigation data, or other data. Message processing device 108 may receive data from one or more data providers 106, may format the received data as a ground-to-air ACARS message and may provide the ground-to-air ACARS message to ground-based communication device 110 for transmission via the Iridium Short Burst Data Service to aircraft-based system 100. When the ACARS message exceeds the maximum payload of the Iridium Short Burst Data Service, ground-based communication device 110 may segment the ACARS message into multiple portions and may transmit each of the multiple portions to aircraft-based system 100 in separate Iridium Short Burst Data messages. When multiple portions of an ACARS message are received by ground-based communication device 110 via the Iridium Short Burst Data Service, ground-based communication device 110 may combine the multiple portions to reconstruct the ACARS message. The ACARS message may then be provided to message processing device 108, which may further provide an ACARS acknowledgment to ground-based communication device 110 for delivery to aircraft-based system 100 and avionics equipment 104 via the Iridium Short Burst Data Service. Message processing device 108 may then deliver the ACARS message to an intended destination, such as, for example, one of data providers 106.

Exemplary Processing Device

Figure 2:
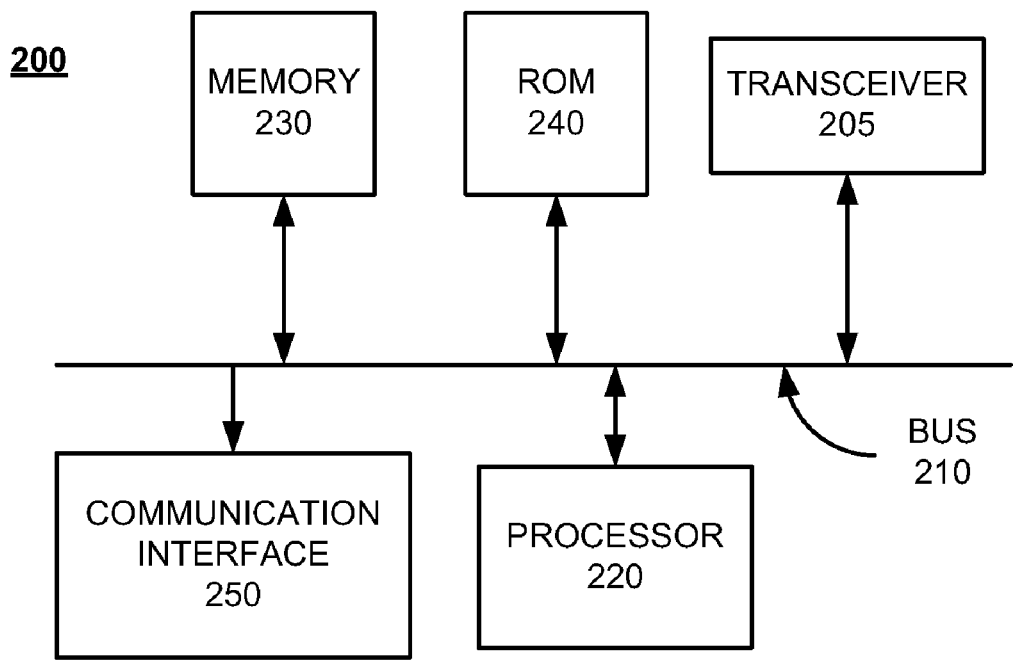
FIG. 2 is a functional block diagram that illustrates an exemplary processing device, which may be used to implement an aircraft-based communication device or a ground-based communication device consistent with the subject matter of this disclosure.

FIG. 2 is a functional block diagram that illustrates an exemplary processing device 200, which may be used to implement embodiments of aircraft-based communication device 102 or ground-based communication device 110 consistent with the subject matter of this disclosure. Processing device 200 may include a bus 210, a processor 220, a memory 230, a read only memory (ROM) 240, a transceiver 205, and a communication interface 250. Bus 210 may permit communication among components of processing device 200.

Transceiver 205 may include one or more L-band transceivers for transmitting and receiving Iridium Short Burst Data messages via the Iridium Short Burst Data Service. Communication interface 250 may provide communications to message processing device 108, when processing device 200 is used to implement ground-based communication device 110, or may provide communications with avionics equipment 104, when processing device 200 is used to implement aircraft-based communication device 102.

Processor 220 may include at least one conventional processor or microprocessor that interprets and executes instructions. Memory 130 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220.

Processing device 200 may perform such functions in response to processing device 120 executing sequences of instructions contained in a tangible machine-readable medium, such as, for example, memory 130, or other medium. Such instructions may be read into memory 130 from another machine-readable medium, such as a storage device (not shown), or from a separate device via a communication interface.

Figure 3:
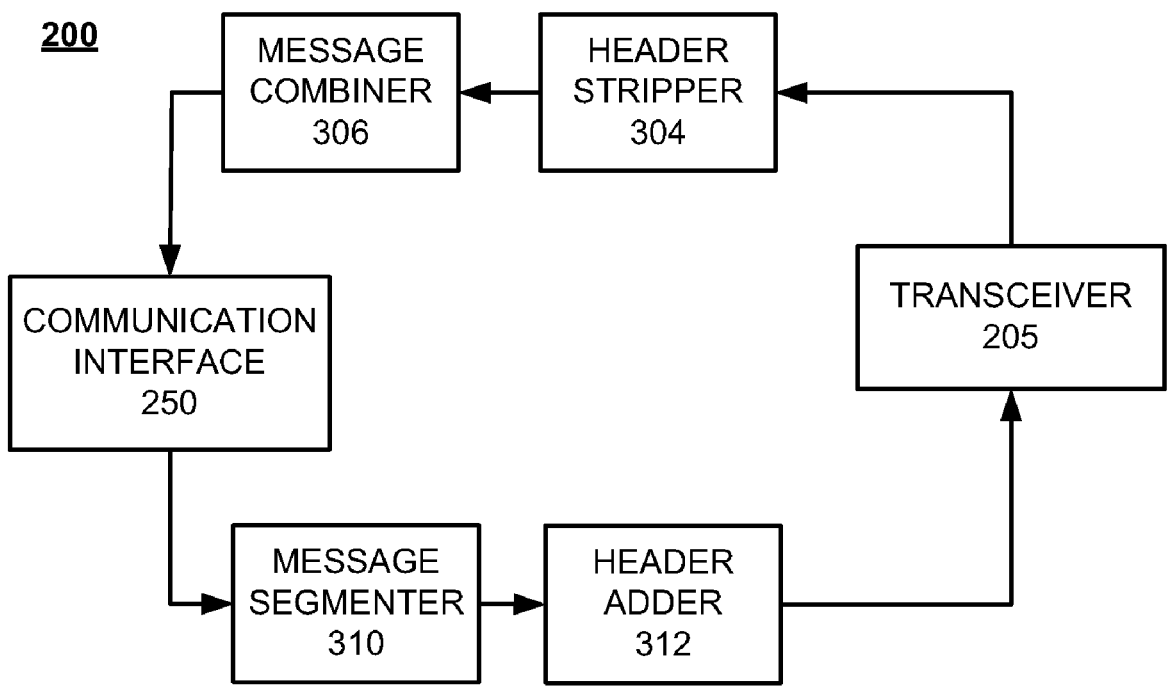
FIG. 3 is a functional block diagram illustrating exemplary functions which may be performed by an aircraft-based communication device or a ground-based communication device.

FIG. 3 is a functional block diagram which helps illustrate functions performed by the processing device 200 when implementing either aircraft-based communication device 102 or ground-based communication device 110. As shown in FIG. 3, processing device 200 may include transceiver 205, header stripper 304, message combiner 306, communication interface 250, message segmenter 310, and header adder 312.

As mentioned previously, transceiver 205 may include one or more L-band transceivers for receiving and transmitting Iridium Short Burst Data messages via the Iridium Short Burst Data Service. Each received Iridium Short Burst Data Message may include at least a portion of an ACARS message and a message header, to be described below. That is, each received Iridium Short Burst Data message may include the message header and, either a complete ACARS message, or a segment or portion of an ACARS message.

Header stripper 304 may remove the above-mentioned message header, or may at least cause the message header to be discarded. Message combiner 306 may combine multiple portions or segments of a received ACARS message. Message segmenter 310 may segment an ACARS message into multiple portions or segments, each of the portions or segments to be transmitted in a separate Iridium Short Burst Data Message via the Iridium Short Burst Data Service. Header adder 312 may add the message header to an Iridium Short Burst Data message. The Iridium Short Burst Data Message may include either a complete ACARS message or a portion or segment of an ACARS message to be transmitted via the Iridium Short Burst Data Service.

As mentioned previously, communication interface 250 may provide communications to message processing device 108, when processing device 200 is used to implement ground-based communication device 110, or may provide communications with avionics equipment 104, when processing device 200 is used to implement aircraft-based communication device 102.

FIGS. 2 and 3 illustrate one exemplary embodiment in which processing device 200 may include processor 220 and memory 220. In such an embodiment, message combiner 306, header stripper 304, header adder 312, and message segmenter 310 may be included in modules as instructions for processor 220 to execute. In other embodiments, processing device 200 may be implemented via other means, such as, for example, an Application Specific Integrated Circuit (ASIC). In such embodiments, message combiner 306, header stripper 304, header adder 312, and message segmenter 310 may be implemented by the ASIC.

Exemplary Message Header

Figure 4:
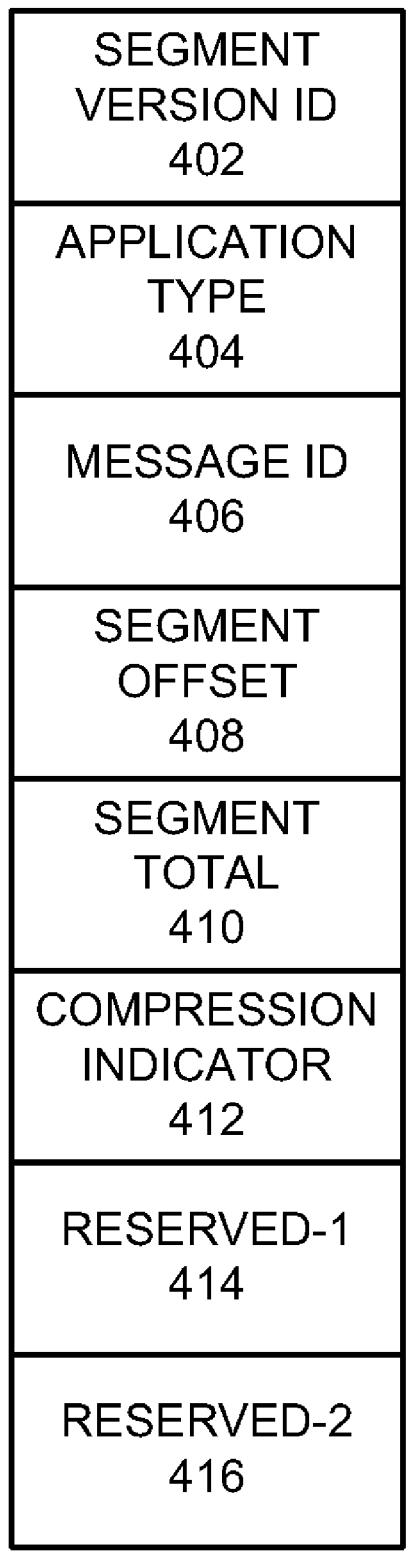
FIG. 4 illustrates an exemplary layout of a message header, which may be included in an Iridium Short Burst Data message.

FIG. 4 illustrates an exemplary message header, which may be included in an Iridium Short Burst Data message having a complete ACARS message or a portion of an ACARS message. The message header may include a segment version ID 402, an application type 404, a message ID 406, a segment offset 408, a segment total 410, a compression indicator 412, reserved-1 414, and reserved-2 416.

Segment version ID 402 may be a one byte field identifying a version of the header. A later version of the header may include more, fewer, or different fields, and a particular format of the header may be indicated by a value of segment version ID 402.

Application type 404 may be a one byte field identifying an application for which the data included in the Iridium Short Burst Data message is intended. Application type 404 may indicate that the data is intended for a weather application, an e-mail application, an ACARS application, or another application. In one embodiment, an application type of 1 may indicate a weather application, an application type of 2 may indicate an e-mail application, and an application type of 3 may indicate an ACARS application. In other embodiments, other values of application type 404 may indicate other or different applications.

Message ID 406 may be a one byte field used to associate multiple portions, or segments, of an ACARS message. For example, an ACARS message, which is segmented and transmitted within separate Iridium Short Burst Data messages, may include a message header in each of the separate Iridium Short Burst Data messages. Each of the message headers may have a same value for message ID 406 to indicate that the segments are associated with one another (i.e., each of the segments are associated with a same ACARS message).

Segment offset 408 may be a one byte field used to indicate an offset of a portion, or segment, of an ACARS message with respect to the complete ACARS message. For example, a value of segment offset 408 may be 200 indicating that the portion or segment of the ACARS message, included in an Iridium Short Burst Data message with the message header, begins at a $200^{th}$ character of the complete ACARS message.

Segment total 410 may be a one byte field used to indicate a total number of segments or portions of the complete ACARS message. For example, when an ACARS message is segmented into four portions, segment total 410, with respect to message headers associated with each of the segments or portions included in separate Iridium Short Burst Data messages, may have a value of 4.

Compression indicator 412 may be a one byte field used to indicate use of a compression algorithm with respect an ACARS message in the Iridium Short Burst Data message. In one embodiment, a compression indicator value of 0 may indicate no compression, a compression indicator value of 1 may indicate compression by a first compression algorithm, a compression indicator value of 2 may indicate compression by a second compression algorithm, and so on.

One or more fields may be reserved for future use, such as, for example, reserved-1 414 and reserved-2 416, which may each be one byte fields.

Exemplary Processing

FIG. 5 is a flowchart which illustrates exemplary processing performed in aircraft-based communication device 102 or ground-based communication device 110, and an embodiment consistent with the subject matter of this disclosure. The process described in FIG. 5 illustrates processing of a received Iridium Short Burst Data message. The process may begin with aircraft-based communication device 102 or ground-based communication device 110 (hereinafter, referred to as the processing device) receiving an Iridium Short Burst Data message via transceiver 205. The Iridium Short Burst Data message may include at least a portion of a message conforming to AEEC specification 618, such as, for example, an ACARS message (act 502).

The processing device may then examine a message header, included in the Iridium Short First Data message, to determine whether the received Iridium Short Burst Data message includes a segmented ACARS message (act 504). The header may have a format as shown in FIG. 4. In one embodiment, the processing device may determine whether the received Iridium Short Burst Data message includes a segmented ACARS message by examining segment total 410 of the message header. If segment total 410 has a value of a 1, then the received Iridium Short Burst Data message may include a complete ACARS message. Otherwise, the received Iridium Short Burst Data message may include a portion, or segment, of the ACARS message.

If, at act 504, the processing device determines that the received Iridium Short Burst Data message includes a complete ACARS message, then header stripper 304 of the processing device may discard the message header and the processing device may deliver the received ACARS message (act 522). If the processing device implements aircraft-based communication device 102, then communications interface 250 of the processing device may deliver the ACARS message to avionics equipment 104. If the processing device implements ground-based communication device 110, then communications interface 250 of the processing device may deliver the ACARS message to message processing device 108, which may return an ACARS acknowledgment to the processing device and may deliver the ACARS message to an intended destination, such as, for example, one of data providers 106.

If, at act 504, the processing device determines that the received Iridium Short Burst Data message includes a portion or segment of an ACARS message, then the processing device may obtain a message ID 406 from the message header (act 506). In embodiments consistent with the subject matter of this disclosure, all portions or segments of a single ACARS message may have a same value for message ID 406 in respective headers included in received Iridium Short Burst Data messages.

The processing device may then determine whether the received portion or segment of the ACARS message is a first segment (act 508). The processing device may determine whether the received portion or segment is the first segment by examining segment offset 408 of the header. If segment offset 408 has a value of 0 then, the received portion or segment of the ACARS message is the first segment.

If the processing device determines that the received portion or segment of the ACARS message is the first segment, then the processing device may save the value of message ID 406 from the message header in order to associate other received segments with a same ACARS message (act 510). Next, processing device may save a value of segment total 410, which may indicate a total number of segments comprising the ACARS message (act 512). The processing device may then set a message segment counter to 1 (act 514). Header stripper 304 of the processing device may discard the message header and the processing device may save the message segment in order to later reconstruct the complete ACARS message (act 518).

If, at act 508, the processing device determines that the portion or segment of the ACARS message included in the received Iridium Short Burst Data message is not the first segment of the ACARS message, then the processing device may increment the message segment counter (act 516), header stripper 304 may discard the message header and the processing device and may save the message segment in order to later reconstruct the complete ACARS message (act 518).

The processing device may then determine whether the ACARS message is complete (act 520). In one embodiment, message combiner 306 of the processing device may determine whether the ACARS message is complete by comparing the message segment counter, for counting the received message segments of the ACARS message, with a value of segment total 410 of the header. If the message segment counter equals the value of segment total 410 of the header, then all segments for the ACARS message have been received, message combiner 306 may reconstruct the message, and communication interface 250 of the processing device may deliver the reconstructed message (act 522).

FIG. 6 is a flowchart illustrating an exemplary process, which the processing device may perform when receiving an ACARS message from avionics equipment 104 (when the processing device implements aircraft-based communication device 102), or when receiving an ACARS message from message processing device 108 (when the processing device implements ground-based communication device 110). The process may begin with communication interface 250 of the processing device receiving the ACARS message (act 602). Message segmenter 310 of the processing device may determine whether the ACARS message is to be segmented in order to send the ACARS message via the Iridium Short Burst Data Service (act 604). Message segmenter 310 may determine that the ACARS message is to be segmented when a size of the ACARS message exceeds a maximum payload size of an Iridium Short Burst Data message, taking into account a message header to be included in the Iridium Short Burst Data message, such as, for example, the message header previously described with respect to FIG. 4.

If message segmenter 310 determines that the ACARS message is not to be segmented, then header adder 312 of the processing device may include the message header with the ACARS message in the Iridium Short Burst Data message and transceiver 205 may transmit the Iridium Short Burst Data message via the Iridium Short Burst Data Service (act 606). As previously discussed, the processing device may set a value of segment offset 408 to 0 and a value of segment total 410 to 1 in the header to indicate that the included ACARS message is not segmented.

If message segmenter 310 of the processing device determines that the ACARS message is to be segmented, at act 604, then message segmenter 310 may segment the ACARS message into multiple portions or segments (act 608). Each of the portions or segments may be included in separate Iridium Short Burst Data messages with respective message headers (added by header adder 312) indicating an offset of the segment, with respect to the complete ACARS message, as well as a total number of segments, and a message ID, as previously discussed. Transceiver 205 of the processing device may then transmit each portion, or segment, of the ACARS message in the separate Iridium Short Burst Data messages, with the respective message headers, via the Iridium Short Burst Data Service.

In the exemplary processes of FIGS. 5 and 6, ACARS messages may include data to be sent to avionics equipment 104, data received from avionics equipment 104, or ACARS acknowledgements (acknowledging receipt of an ACARS message) from avionics equipment 104 or message processing device 108. ACARS messages including ACARS data or ACARS acknowledgments may be treated in a same manner by processing device 200 when implementing aircraft-based communication device 102 or ground-based communication device 110.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A ground-based communication device that communicates with an aircraft-based communication device via an Iridium Short Burst Data Service, the ground-based communication device comprising:
a communication interface, that receives from and sends to a ground-based processing device, ACARS messages;
a header adder that adds an Iridium header to at least a portion of an ACARS message received from the ground-based processing device, the Iridium header including an application indicator for indicating one of a plurality of applications to which the at least a portion of the message pertains, a message identifier for associating a plurality of message portions of the ACARS message, and a segment offset indicating a placement of each of the plurality of message portions with respect to the ACARS message;
a message segmenter that segments messages based on the transceiver used by each aircraft, and
an L-band transceiver that sends an Iridium Short Burst Data message to an aircraft-based communication device, the Iridium Short Burst Data message including the at least a portion of the ACARS message and the added Iridium header.

2. The ground-based communication device of claim 1, wherein:
the L-band transceiver receives a second Iridium Short Burst Data message from the aircraft-based communication device, the second Iridium Short Burst Data message including at least a portion of a second ACARS message and an added second Iridium header, the added Iridium second header including a second application indicator for indicating one of a plurality of second applications to which the at least a portion of the second ACARS message pertains, a second message identifier for associating a plurality of message portions of the second ACARS message, and a second segment offset indicating a placement of each of the plurality of message portions of the second ACARS message with respect to the second ACARS message,
the ground-based communication device further comprises a header stripper to discard the second Iridium header from the received second Iridium Short Burst Data message, and
the communication interface is further for sending the second ACARS message without the second Iridium header, to the ground-based processing device.

3. The ground-based communication device of claim 2, further comprising:
a message combiner to combine a plurality of message portions of the received second ACARS message to form the received second ACARS message, the plurality of message portions of the received second ACARS message being included in received second Iridium Short Burst Data messages, each of the received plurality of message portions including a respective one of the second Iridium headers having a same second message identifier.

4. The ground-based communication device of claim 1, wherein the message segmenter determines whether a size of the ACARS message exceeds a maximum payload size for an Iridium Short Burst Data Service and segments the message into a plurality of message portions when the size of the message is determined to exceed the maximum payload size for the Iridium Short Burst Data Service, each of the plurality of message portions being placed in respective payloads of Iridium Short Burst Data messages to be transmitted to the aircraft-based communication device.

* * * * *